Patented Feb. 26, 1935

1,992,263

UNITED STATES PATENT OFFICE 1,992,263

STORAGE OF EGGS

Hans W. Vahlteich, New York, N. Y., and Jacob L. Schille, Union, N. J., assignors to The Best Foods, Inc., New York, N. Y., a corporation of New Jersey No Drawing. Application July 23, 1930, Serial No. 470,247

4 Claims. (Cl. 99—14)

This invention relates to the storage of eggs and more particularly to an improved procedure for treating the edible portions of eggs which are to be frozen and stored.

It is the practice among bakers and manufacturers of other food products containing eggs, for example mayonnaise, to purchase their eggs in advance and preserve them by keeping them at a low temperature during the period of storage. This is generally done by one of two methods, viz. by storing the eggs in the shell at approximately 32° F. or by storing the edible portion of the eggs (whites and yolks separately or mixed together) in suitable and hygienic containers (usually 30# sanitary tins) at a temperature between minus 5 and zero degrees Fahrenheit or thereabouts, at which temperatures the egg material is kept in a solid frozen condition. This invention pertains to the storage of the latter, or frozen, eggs and not to the storage of eggs in the shell.

It has been suggested that sugar or small quantities of mixtures of sugar and salt may be added to egg yolk for the purpose of improving the characteristics of the frozen and subsequently thawed product. However, the quantities heretofore added for this purpose have been insufficient to accomplish the improvement resulting from our new process.

When egg material is frozen for storage it must ordinarily be warmed to convert it into a plastic mass before it can be used in the manufacture of a food product. This warming or thawing takes a considerable time and, because of the low conductivity of the heat through the frozen mass, there is a marked increase in the bacteria count in that portion of the egg material which is nearest the walls of the container, which portion often becomes molten while the interior portion of the egg mass is still frozen solid.

It is an object of our invention to provide a method of treating the eggs whereby they may be stored for a considerable period of time without a substantial increase in bacteria count. It is a further object to prevent or to minimize the increase in bacteria count which ordinarily accompanies the thawing of frozen eggs. Another object of the invention is to provide a mixture of frozen eggs which may be added, after thawing, directly to the food product, without the usual addition of seasoning materials. It is also an object to provide an improved method for producing mayonnaise and an improved egg material, adapted for use in such method. A further object is to improve the color of the egg material and that of the product prepared from it. Other objects will become apparent.

Although the following description will be confined to the treatment of whole egg materials, it is not intended thereby to limit the invention to such use since it may also be applied to other egg materials containing substantially the quantities of egg yolk and egg white in the normal hen's egg, and in using the term "whole egg material" in the appended claims, it is intended to include such materials, as differentiated from dry or commercial egg yolks.

In the preparation of the eggs for storage the shells are broken and the egg material is removed and thoroughly stirred to break the yolks and to mix them with the whites. Care should be taken to break the yolk membranes in order to prevent the irreversible solidification which results if the whole yolk is frozen and stored. Quantities of salt and sugar sufficient to give the desired flavor to the food product in which they are to be used are added to the eggs treated in this manner. For example, if the eggs are to be used in the manufacture of mayonnaise, about 17 pounds of salt and 13 pounds of sugar are added to and thoroughly mixed with 100 pounds of whole egg material. The mixture of eggs, sugar and salt is then frozen in the usual manner and maintained at a temperature of about —5° to 0° F.

When the eggs are ready for use they are removed from cold storage and allowed to thaw. By the addition of the quantities of salt and sugar described above, the melting point of the mixture is reduced to about —8 to —10° F. and because of this reduction in melting point the mixture will thaw quickly to a mobile liquid in a room maintained at ordinary room temperature, the resulting thawed mass being still relatively cold; for example, it may be about 15-20° F.

The viscosity of the egg mixture which has been treated as described is very much reduced by this procedure. The product may be advantageously used in preparing food products, such as mayonnaise, and because of this reduced viscosity it may be handled more conveniently.

In the manufacture of mayonnaise it has been found that when the ingredients are mixed at ordinary room temperature, for example 75-90° F., the resulting mayonnaise is soft in texture and quite readily shows oil separation when transported on motor vehicles, where considerable vibration is given to the load. On the other hand if the mayonnaise is made in a room, the temperature of which is maintained below these temperatures, and with oil and other ingredients which are precooled to 60° or lower, the resulting mayonnaise will be of firm texture and will more readily withstand the rigors of transportation.

Because of this and the further fact that during the manufacture of the mayonnaise considerable heat is developed in beating up the product, it is desirable, in the manufacture of mayonnaise, to maintain the thawed egg material at as low a temperature as possible. By following our improved procedure for preparing the frozen egg material a thawed product may be obtained having a temperature of about 15–20° F. This material may be added directly to the other ingredients used in manufacturing the mayonnaise and the resulting product will be much cooler than that ordinarily produced. Also the greater mobility resulting from the addition of the increased amount of salt and sugar will permit the convenient mixing of the ingredients at a considerably lower temperature than that ordinarily practicable.

By following the procedure described, the denaturization of the egg materials will be also avoided and their keeping qualities will be so improved that they may be stored for several months without deterioration. For example, we have found that after several months the bacteria count in egg materials treated as described will be so low that it will not be indicated in the ordinary tests or at most will show a very low count as compared to eggs treated by the methods usually followed in storing frozen eggs.

Since the total quantity of salt and sugar required in the final product has already been added, the usual step of adding these materials in preparing the finished product is avoided.

The addition of such a large proportion of salt to the eggs before freezing has the effect of increasing the redness of the egg mass. This increase in redness gives an improved color to the finished product, particularly where it is to be used in preparing a food product such as mayonnaise, where this deeper color is desirable.

The quantity of salt and sugar added may, of course, be varied and balanced to give the desired flavor to the finished product, and it is not intended to limit the invention to the particular example given as an illustration. For example, the proportion of sugar may be greatly increased or decreased to produce the desired flavor in the finished product. Other seasoning materials, for example, oil of mustard, may also be added to the egg material before freezing, in the proportions required in the finished product.

The reduction in melting point will vary with the change in proportions of salt and sugar added, but to obtain the best results the quantity added should be such that the melting point will be reduced to between about −5° and −15° F. The addition of a larger proportion of salt causes a much greater reduction in melting point than would the addition of an equal quantity of sugar and since this reduction in melting point is of particular importance in preventing the increase in bacteria count, this additional quantity of salt is essential to the invention.

Many other modifications of the invention will be apparent to one skilled in this art and it is not intended to limit it to the particular embodiments described. The terms used in describing these embodiments are used in an illustrative sense and not as limitations upon the scope of the invention.

What we claim is:

1. A frozen product comprising whole egg material mixed with about 13% by weight of salt and 10% by weight of sugar.

2. In the preparation of mayonnaise, the steps comprising mixing with whole egg material about 13% by weight of salt and 10% by weight of sugar, freezing and thawing the mixture and thereafter mixing it with the other ingredients of mayonnaise while the mayonnaise mixture is maintained at a temperature of not more than about 60° F.

3. In the preparation of mayonnaise, the steps comprising mixing with whole egg material about 13% by weight of salt and 10% by weight of sugar, freezing the mixture and maintaining it at a temperature of −5 to 0° F., and thereafter thawing it and mixing it with the other ingredients of the mayonnaise while the mayonnaise mixture is maintained at a temperature of not more than about 60° F.

4. In the storage of egg material, the steps comprising mixing whole egg material with about 13% by weight of salt and 10% by weight of sugar and maintaining the mixture at a temperature of about −5 to 0° F.

HANS W. VAHLTEICH.
JACOB L. SCHILLE.